United States Patent Office 2,911,324
Patented Nov. 3, 1959

2,911,324

TREATMENT OF MATERIALS TO IMPROVE WATER-REPELLENCY

John Gwynant Evans, Menston-in-Wharfedale, George Landells, Meanwood, Leeds, and William Salkeld Meals, Bradford, England, assignors to The Bradford Dyers' Association Limited, Bradford, England, a British company No Drawing. Application January 3, 1956
Serial No. 556,780

Claims priority, application Great Britain January 4, 1955

1 Claim. (Cl. 117—135.5)

This invention relates to the treatment of porous materials and especially fibrous materials in such manner as to impart water repellency properties or improve existing water repellent properties.

The materials which may be treated according to the invention include paper, textile materials made from natural and/or synthetic fibres, and fur.

It is already well known that the deposition of siliconaceous substances on the surface of materials not normally water repellent confers the property of water repellency. The deposition of silicon compounds for this purpose has hitherto been carried out in a variety of ways including application from the vapour phase, from the liquid phase, from solution in an inert organic solvent, from aqueous solution, from aqueous dispersion, or in the form of a paste or grease.

Silicon compounds which have been employed and with which the present invention is essentially concerned are those which consist of hydrolyzable organosilanes or the products of hydrolysis of said hydrolyzable organosilanes, said hydrolyzable organosilanes containing organic groups linked to the silicon through carbon-silicon linkage and containing hydrolyzable substituents directly attached to the silicon, said organic radicals being preferably alkyl, aryl or alkenyl radicals.

Although the exact nature of the hydrophobic coating formed is unknown, organo-halogeno-silanes, for example, are thought to combine with reactive groups of substances on or in the surface to be treated leaving a deposit or film of siloxane or silicone which renders the surface water-repellent. Thus a mixture of methyl chlorosilanes applied from the vapour phase is particularly effective. The hydrolysis products of the substituted silanes may be dissolved in strong water-soluble bases to give the so-called siliconates conferring water-repellent properties. Indeed, any of the aforesaid substituted silanes used for the production of silicones, when applied under suitable conditions, may be regarded as potential agents for the production of water-repellent surfaces.

The organo silicon compounds with which the present invention is more especially concerned are those in which the organic groups linked to silicon through carbon-silicon linkage are alkyl radicals such as methyl, ethyl, propyl, and octadecyl. More especially the preferred organosilicon compounds are, or at least include, those in which a hydrogen atom is linked to silicon. Thus the preferred siloxanes are those such as methylpolysiloxanes, particularly those which also contain hydrogen atoms directly bonded to silicon atoms in the molecule. These methylhydrogenpolysiloxanes are well known to the art.

The most preferred of the organosilicon compounds in relation to the present invention are methylhydrogenpolysiloxanes employed in a mixture which also contains dimethylpolysiloxanes, such as mixtures described in British specification No. 680,265. This mixture comprises from 20 to 70% by weight of (1) a methylpolysiloxane containing between 2 and 2.1 methyl radicals per silicon atom and having a viscosity at 25° C. of at least 1,000 cs. and less than 100,000 cs., and from 80 to 30% by weight of (2) a methylhydrogenpolysiloxane containing between 1.0 and 1.5 methyl radicals and between 0.75 and 1.25 hydrogen atoms bonded to silicon per silicon atom, there being a total of between 2 and 2.25 methyl radicals plus hydrogen atoms per silicon atom.

According to the present invention striking improvements in the degree of water-repellency produced by means of treatment with silicon compounds such as hereinbefore mentioned are obtained when such treatments are carried out in conjunction with certain titanium compounds namely alkanolamine esters of titanium, more particularly triethanolamine, diethanolamine and monoethanolamine esters.

The proportion of titanium compounds to organosilicon compounds employed may vary over a wide range, and a certain amount of improvement is found in practically any combination of the two types of constituents. For example, improvements are found when the proportion of titanium compound used varies from 1 percent by weight to 150 percent by weight based upon the weight of the organosilicon compound employed. The preferred proportion of titanium compound employed, however, varies from about 2.5 or 5 percent to about 125 percent by weight based upon the weight of the organosilicon compound. The optimum ratio of the two types of compounds will, of course, depend both upon the particular compounds employed and the material being treated. In some cases 75 percent or even 25 percent may be the optimum upper limit for the amount of the titanium compound.

The titanium compounds and the organosilicon compounds are not necessarily employed as single constituents. That is, a plurality of either or both types of compounds may be used if desired.

A final heating of material treated according to the invention is preferably but not essentially performed. Its duration may vary from a few seconds to, say, thirty minutes according to the temperature or means of heating employed, it being understood that the higher the temperature the shorter the duration. A temperature range of from 100° C. to 200° C. is generally suitable, but the temperature used may be varied within or outside these limits to suit the nature of the material which is treated. The heating may be carried out by any of the conventional methods such as by passing the treated material through ovens or hot air chambers or over heated surfaces; by infra red radiation or by high frequency heating; or by passage through a heated oleaginous or molten metal bath. As an alternative to heat treatment, the material may be exposed to visible and/or ultra violet light.

The silicon compound may be applied to the material before, simultaneously or after the application of the titanium compound. The silicon compound may be applied in the liquid or vapour phase, in an organic solvent solution or dispersion, or in an aqueous solution or dispersion. The titanium compound is most conveniently applied in solution or dispersion in water or in solution in an organic solvent.

In one method of performing the invention the silicon compound is dissolved in a common organic solvent with the titanium compound. This solution is then applied to the base material and the solvent evaporated. The material may then be heated.

In another method of performing the invention the base material is firstly treated with the titanium compound, either in an aqueous or organic solvent solution or dispersion followed by drying, and secondly treated with an aqueous emulsion or dispersion of the silicon compound. The titanium compound may however be applied simultaneously with the aqueous emulsion or dispersion of the silicon compound. In either case, after drying off the water, the treated base material is preferably heated.

The triethanolamine titanate is especially useful in this invention because it is soluble both in water and in organic solvents. Being soluble in water, it can be dissolved in an aqueous emulsion of the silicon compound. Concentrated aqueous emulsions containing the silicon compound and the titanium compound are reasonably stable so that they may be stored for a convenient length of time prior to dilution with water and use in the treatment of the porous materials.

It is remarkable that the alkanolamine esters of titanium which themselves have no substantial water repellency effects upon materials, improve to a very considerable extent the performance of the aforesaid silicon compounds in imparting water repellency especially to textiles.

The test used for determining the water repellency of textiles of the following examples is the Bundesmann test also known as Tentative Textile Standard No. 8, 1947, and described in the Journal of the Textile Institute, 1947, volume 38, S.4. The rate of flow of water according to the test is 65 ml. per minute and the test time 10 minutes. Means are provided in this test for any water passing through the fabric to be collected and measured. Thus two observations are recorded: (a) the resistance to actual wetting as measured by the amount of absorption i.e. weight increase determination, and (b) the penetration i.e. the extent to which the fabric resists passage of water. The test results are the mean of at least two determinations.

In the following examples which are illustrative only, the parts given are parts by weight. The "silicone" employed throughout the examples, unless otherwise specified, is a mixture of 60 percent by weight of trimethylsiloxy end-blocked methylhydrogen-polysiloxane and 40 percent by weight of trimethylsiloxy end-blocked dimethylpolysiloxane having a viscosity of 12,500 centistrokes at 25° C.

EXAMPLE 1

An emulsion of silicone is prepared by agitating a solution of 3.1 parts of cetyl dimethyl benzyl ammonium chloride and 0.1 parts of acetic acid in 11.4 parts of water and adding 61.9 parts of a solution of silicone in white spirit containing 65 parts of silicone per 100 parts of solution. After passing this mixture through a colloid mill a further 23.5 parts of water are mixed in to give 100 parts of an emulsion containing 40 parts of silicone.

A cellulose acetate poult fabric is impregnated with said emulsion diluted with water to give a silicone solids content of 2.5 parts for every 97.5 parts of the aqueous phase. 100 parts of fabric pick up 80 parts of liquid to give 2 parts of silicone solids for every 100 parts of fabric. The fabric is dried and heated at 150° C. for 4 minutes.

A similar specimen of fabric is impregnated with a solution of 2.5 parts of triethanolamine titanate in water and dried to give 2 parts of triethanolamine titanate for every 100 parts of fabric. The fabric is heated at 150° C. for 4 minutes. A third specimen is impregnated with emulsion prepared as aforesaid but containing 2.34 parts of silicone solids and 0.16 part of triethanolamine titanate (dissolved in the water of dilution) for every 97.5 parts of the aqueous phase. This gives on drying respectively 1.875 and 0.125 parts of the silicone and the titanium ester for every 100 parts of fabric. The fabric is heated at 150° C. for 4 minutes. The three specimens are then tested by the Bundesmann water repellency test. The results are as follows:

Table

| | Absorption (percent) | Penetration (cc.) |
|---|---|---|
| Not proofed | 108 | 120.0 |
| Incorporating 2% silicone | 77.3 | 45.0 |
| Incorporating 2% triethanolamine titanate | 129 | 102.5 |
| Incorporating 1.875% silicone and 0.125% triethanolamine titanate | 35.8 | 1.5 |

These results show the marked improvement in water repellency brought about by the incorporation of triethanolamine titanate in an aqueous silicone emulsion.

EXAMPLE 2

A cellulose acetate poult fabric is impregnated with a solution containing 1.875 parts of silicone and 0.125 part of monoethanolamine titanate in 98 parts of dichloroethylene, dried and heated at 140° C. for 10 minutes. Further samples of the same fabric are impregnated with solutions containing respectively 2 parts of silicone or 2 parts of monoethanolamine titanate in the same organic solvent as aforesaid, and likewise dried and heated. The combination of silicone and monoethanolamine titanate gives improved water-repellent results as compared with either component applied separately as shown by the results of Bundesmann tests.

| | Absorption (percent) | Penetration (cc.) |
|---|---|---|
| Treated with the 2% silicone solution | 61.0 | 10 |
| Treated with the 2% monoethanolamine titanate solution | 78.8 | 21 |
| Treated with the 1.875% silicone and 0.125% monoethanolamine titanate solution | 47.8 | 0 |

EXAMPLE 3

The same fabric referred to in Example 2 is impregnated with a solution containing 1.875 parts of silicone and 0.125 part of diethanolamine titanate in 98 parts of dichloroethylene, dried and heated at 140° C. for 10 minutes. The combination gives improved water repellent results, when tested by the same method as used in Example 2 and compared with the results therein.

| | Absorption (percent) | Penetration (cc.) |
|---|---|---|
| Treated with 2% diethanolamine titanate solution in dichloroethylene | 117.5 | 36 |
| Treated with the 1.875% silicone and 0.125% diethanolamine titanate solution | 32.4 | 0 |

EXAMPLE 4

Specimens of a wool gabardine fabric are impregnated with a series of solutions all containing, in 98 parts of dichloroethylene 1.9 parts of silicone and otherwise respectively containing 0.1 part of monoethanolamine titanate, 0.1 part of diethanolamine titanate and 0.1 part of triethanolamine titanate. A control specimen is impregnated with a solution of 2 parts of the silicone alone in the same organic solvent. The specimens are then dried and heated for 3 minutes 20 seconds at 150° C. The improvement in water repellency produced by the titanates is shown by the results of the Bundesmann water-repellency tests.

|  | Absorption (percent) | Penetration (cc.) |
|---|---|---|
| Treated with the 2% silicone solution | 81.6 | 4 |
| Treated with the 1.9% silicone and 0.1% monoethanolamine titanate solution | 30.4 | 1 |
| Treated with the 1.9% silicone and 0.1% diethanolamine titanate solution | 27.8 | 1 |
| Treated with the 1.9% silicone and 0.1% triethanolamine titanate solution | 34.7 | 2 |

EXAMPLE 5

Specimens of polyethylene terephthalate (Terylene) satin fabric are impregnated with the mixtures of silicone and titanates precisely as in Example 4 and a control specimen in the silicone solution alone. The specimens are then dried and heated for 4 minutes at 140° C. The improvement in water repellency produced by the titanates is shown by the results of the Bundesmann tests.

|  | Absorption (percent) | Penetration (cc.) |
|---|---|---|
| Treated with the 2% silicone solution | 48.1 | 45 |
| Treated with the 1.9% silicone and 0.1% monoethanolamine titanate solution | 8.9 | 18 |
| Treated with the 1.9% silicone and 0.1% diethanolamine titanate solution | 5.5 | 22 |
| Treated with the 1.9% silicone and 0.1% triethanolamine titanate solution | 7.1 | 21 |

EXAMPLE 6

A series of solutions are made up in 98.0 parts dichloroethylene as follows:

(a) 2.0 parts silicone.
(b) 1.875 parts silicone, 0.125 part diethanolamine titanate.
(c) 1.875 parts silicone, 0.125 part triethanolamine titanate.

Samples of different fabrics, namely a cellulose acetate taffeta, a cotton gabardine, and a nylon poplin are impregnated in these solutions, dried and heated for 3½ minutes at 160° C. The marked improvement in water repellency of the fabrics when the alkanolamine derivatives are present is shown by the following results:

| Treatment | Acetate Taffeta | | Cotton Gabardine | | Nylon Poplin | |
|---|---|---|---|---|---|---|
|  | Absorption (percent) | Penetration (cc.) | Absorption (percent) | Penetration (cc.) | Absorption (percent) | Penetration (cc.) |
| (a) 2 parts silicone | 139.6 | 42 | 118.7 | 109 | 20.9 | 1 |
| (b) 1.875 parts silicone, 0.125 part diethanolamine titanate | 57.6 | 1 | 65.8 | 1 | 10.5 | 2 |
| (c) 1.875 parts silicone, 0.125 part triethanolamine titanate | 74.0 | 7.5 | 70.5 | 1 | 7.6 | 1 |

EXAMPLE 7

A nylon poplin is impregnated with a solution containing 1.875 parts of silicone and 0.125 part of monoethanolamine titanate in 98 parts of dichloroethylene, dried and heated for 4 minutes at 140° C. The improvement in water repellency is shown by the following Bundesmann absorption tests.

Absorption, percent
Treated with a 2% silicone solution _____ 20.9
Treated with the 1.875% silicone and 0.125% monoethanolamine titanate solution _____ 14.3

EXAMPLE 8

Specimens of cellulose acetate poult are impregnated with the following solutions:

(a) 0.125 part triethanolamine titanate in 99.875 parts dichloroethylene.
(b) 0.125 part triethanolamine titanate in 99.875 parts water.

After drying, the specimens are further impregnated with a solution of 1.875 parts silicone in 98.125 parts white spirit, which solvent is not a solvent for triethanolamine titanate. After drying, the specimens are heated for 2 minutes at 160° C.

The water repellency of these specimens is tested by the Bundesmann method and compared with that of specimens of the same fabric treated as follows:

(c) Impregnated with a solution containing 2 parts silicone in 98 parts white spirit, dried and heated for 2 minutes at 160° C.
(d) Impregnated with a solution containing 1.875 parts silicone and 0.125 part triethanolamine titanate in 98 parts dichloroethylene, dried and heated for 2 minutes at 160° C.

The results were as follows:

|  | Absorption (percent) | Penetration (cc.) |
|---|---|---|
| Specimen: |  |  |
| (a) | 53.2 | 1 |
| (b) | 38.6 | 1 |
| (c) | 75.6 | 22 |
| (d) | 53.0 | 1 |

The superior water repellency of all the specimens, viz. (a), (b) and (d) which contain triethanolamine titanate is evident.

EXAMPLE 9

A silicone emulsion is prepared by stirring at high speed 7 parts of oleic acid dissolved in 41 parts of a solution of silicone in white spirit containing 65 parts of silicone per 100 parts of solution, and adding 3 parts of triethanolamine titanate dissolved in 50 parts of water. This emulsion is diluted with water to give an emulsion containing 2 parts of silicone per 100 parts of emulsion.

The diluted emulsion is used to prepare water repellent fabrics. A cellulose acetate poult and a nylon poplin are impregnated in the emulsion, dried and heated respectively for 2 minutes at 160° C. and 4 minutes at 140° C.

Results of Bundesmann repellency tests compare extremely favourably with those obtained by treating the fabrics with a 2% silicone emulsion prepared in the absence of a titanium compound as described in the first part of Example 1.

|  | Cellulose Acetate Poult | | Nylon Poplin | |
|---|---|---|---|---|
|  | Absorption (Percent) | Penetration (cc.) | Absorption (Percent) | Penetration (cc.) |
| Treated with 2% silicone emulsion, no titanium compound | 139.8 | 58 | 48.2 | 178 |
| Treated with 2% silicone emulsion containing triethanolamine titanate | 67.7 | 6 | 11.4 | 1 |

EXAMPLE 10

Specimens of nylon taffeta are impregnated with the following aqueous emulsions:

(a) An emulsion containing 2 parts of silicone in 100 parts of emulsion (prepared as described in the first part of Example 1)
(b) An emulsion containing 1.8 parts silicone with 0.2 part diethanolamine titanate emulsified in 100 parts of water (prepared as described below)
(c) An emulsion containing 2 parts diethanolamine titanate in 100 parts water (prepared as described below)

After impregnation the specimens are dried and heated for 4 minutes at 140° C.

When tested for water absorption by the Bundesmann method the specimens give the following results:

|  | Absorption, percent |
|---|---|
| (a) | 98.6 |
| (b) | 53.3 |
| (c) | 109.7 |

It is clear that (b), which contains both silicone and diethanolamine titanate, gives much superior results to either (a) or (c).

The differences in water repellency are shown even more strikingly when the fabrics are tested by the spray test of the American Standards Association as described in the 1954 edition of the Technical Manual and Year Book of the American Association of Textile Chemists and Colourists, vol. XXX, page 136. The results were:

|  | Spray rating |
|---|---|
| (a) | 0 |
| (b) | 80 |
| (c) | 0 |

The emulsion of diethanolamine titanate is prepared by mixing 1 part of cetyl dimethyl benzyl ammonium chloride with 10 parts diethanolamine titanate and pouring the mixture into 89 parts of water with rapid stirring. This stock emulsion is diluted with water to make the emulsion required for treatment (c) above, and for adding to the silicone emulsion of (a) to be used for treatment (b).

EXAMPLE 11

Specimens of paper are impregnated with the following solutions:

(a) 1 part of silicone dissolved in 99 parts of dichloroethylene
(b) 1 part of triethanolamine titanate dissolved in 99 parts of dichloroethylene
(c) 0.93 part of silicone and 0.07 part of triethanolamine titanate in 99 parts of dichloroethylene After evaporating the solvent in a stream of air, each specimen of paper is heated for 3 minutes at 150° C. and assessed for water repellency, using the spray test of the American Standards Association. The results are as follows:

|  | Spray rating |
|---|---|
| (a) Treated with the 1% silicone solution | 70 |
| (b) Treated with the 1% triethanolamine titanate solution | 50 |
| (c) Treated with the 0.93% silicone and 0.7% triethanolamine titanate solution | 90 |

What is claimed is:

The method of rendering textile material water repellent comprising contacting said material with both (1) a mixture of from 20 to 70 percent by weight of a methylpolysiloxane containing between 2 and 2.1 methyl radicals per silicon atom and having a viscosity at 25° C. of at least 1,000 cs. and less than 100,000 cs., and from 80 to 30 percent by weight of a methylhydrogenpolysiloxane containing between 1.0 and 1.5 methyl radicals and between 0.75 and 1.25 hydrogen atoms bonded to silicon per silicon atom, there being a total of between 2 and 2.25 methyl radicals plus hydrogen atoms per silicon atom, and (2) a titanium compound selected from the group consisting of the triethanolamine, diethanolamine and monoethanolamine esters of titanium.

References Cited in the file of this patent

UNITED STATES PATENTS

| 2,588,365 | Dennett | Mar. 11, 1952 |
| 2,588,366 | Dennett | Mar. 11, 1952 |
| 2,672,455 | Currie | Mar. 16, 1954 |
| 2,735,791 | Peyrot et al. | Feb. 21, 1956 |
| 2,774,690 | Cockett et al. | Dec. 18, 1956 |
| 2,790,736 | McLaughlin et al. | Apr. 30, 1957 |